United States Patent
Jendoubi et al.

(10) Patent No.: US 9,428,912 B2
(45) Date of Patent: Aug. 30, 2016

(54) PVC MEMBRANE WITH REDUCED PLASTICIZER MIGRATION

(71) Applicant: Sika Technology AG, Baar (CH)

(72) Inventors: Elyes Jendoubi, Zürich (CH); Carine Kerber, Sarnen (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 14/382,696

(22) PCT Filed: Apr. 2, 2013

(86) PCT No.: PCT/EP2013/056908
§ 371 (c)(1),
(2) Date: Dec. 10, 2014

(87) PCT Pub. No.: WO2013/150009
PCT Pub. Date: Oct. 10, 2013

(65) Prior Publication Data
US 2015/0118404 A1    Apr. 30, 2015

(30) Foreign Application Priority Data

Apr. 2, 2012 (EP) .................................... 12162819

(51) Int. Cl.
*C08J 7/04* (2006.01)
*E04D 5/06* (2006.01)
(Continued)

(52) U.S. Cl.
CPC ............... *E04D 5/10* (2013.01); *B05D 3/0254* (2013.01); *B05D 3/0406* (2013.01);
(Continued)

(58) Field of Classification Search
None
See application file for complete search history.

(56) References Cited

U.S. PATENT DOCUMENTS 5,713,141 A * 2/1998 Mitchell ............ A43B 13/203
36/29
5,939,205 A * 8/1999 Yokoyama ............ B32B 27/34
264/235.8
(Continued)

FOREIGN PATENT DOCUMENTS

EP    1500493 A1    1/2005
JP    60224542 A    11/1985
(Continued)

OTHER PUBLICATIONS

"International Application Serial No. PCT/EP2013/056908, International Preliminary Report on Patentability mailed Apr. 2, 2014", (with English Translation) 18 pgs.
(Continued)

*Primary Examiner* — William Phillip Fletcher, III
(74) *Attorney, Agent, or Firm* — Schwegman Lundberg & Woessner, P.A.

(57) ABSTRACT

The present invention relates to a membrane comprising a bulkhead layer, wherein more than 50% by weight of the bulkhead layer is composed of PVC, and a barrier layer. The barrier layer can, on the one hand, be a barrier layer S1, wherein the barrier layer S1 has a polyvinyl alcohol layer comprising more than 50% by weight of copolymer PA, which is connected to the bulkhead layer by a polyurethane layer, wherein more than 10% by weight of the polyurethane layer is composed of polyurethane PUR. The barrier layer can, on the other hand, be a barrier layer S2, wherein the barrier layer S2 has a composition comprising 5-50% by weight of polyurethane PUR and 50-95% by weight of copolymer PA. The membranes according to the invention have significantly lower plasticizer migration compared to the membranes of the prior art and are distinguished by improved resistance to aging, particularly as regards the adherence of the barrier layer on the bulkhead layer, and imperviousness to damp.

9 Claims, 1 Drawing Sheet

(51) Int. Cl.
  *E04D 5/10*  (2006.01)
  *B05D 7/04*  (2006.01)
  *B05D 3/04*  (2006.01)
  *B05D 3/06*  (2006.01)
  *B05D 7/00*  (2006.01)
  *B05D 3/02*  (2006.01)

(52) U.S. Cl.
  CPC ......... *B05D 3/0413* (2013.01); *B05D 3/0473* (2013.01); *B05D 3/065* (2013.01); *B05D 3/066* (2013.01); *B05D 7/544* (2013.01); *B05D 7/546* (2013.01); *C08J 7/042* (2013.01); *C08J 7/047* (2013.01); *C08J 2327/06* (2013.01); *C08J 2429/04* (2013.01); *C08J 2475/04* (2013.01); *Y10T 428/3158* (2015.04)

(56) References Cited

U.S. PATENT DOCUMENTS

| | | | |
|---|---|---|---|
| 2003/0068534 A1* | 4/2003 | Ohkawa | C08J 7/06 428/701 |
| 2003/0124278 A1* | 7/2003 | Clark | B32B 7/02 428/35.7 |
| 2006/0162860 A1* | 7/2006 | Henke | C08G 18/10 156/327 |
| 2007/0178263 A1* | 8/2007 | Guilleux | C09D 201/08 428/35.2 |

FOREIGN PATENT DOCUMENTS

| | | | |
|---|---|---|---|
| JP | 06-184335 A | * | 7/1994 |
| JP | 6184335 A | | 7/1994 |
| JP | 9-039173 A | | 2/1997 |
| JP | 09-039173 A | * | 2/1997 |
| JP | 9-057914 A | | 3/1997 |
| JP | 09-057914 A | * | 3/1997 |
| WO | WO-2013150009 A1 | | 10/2013 |

OTHER PUBLICATIONS

"International Application Serial No. PCT/EP2013/056908, International Search Report mailed Jun. 27, 2013", w/English translation, 7 pgs.

* cited by examiner

PVC MEMBRANE WITH REDUCED PLASTICIZER MIGRATION

PRIORITY APPLICATIONS

This application is a U.S. National Stage Filing under 35 U.S.C. §371 from International Application No. PCT/EP/2013/056908, filed on 2 Apr. 2013, and published as WO 2013/15009 on 10 Oct. 2013, which claims the benefit under 35 U.S.C. §119 to EP Application No. 12162819.2, filed on 2 Apr. 2012; which applications and publication are incorporated herein by reference in their entirety.

TECHNICAL FIELD OF THE INVENTION

This invention relates to the field of waterproofing in the construction industry, in particular in roofing materials.

BACKGROUND OF THE INVENTION

For waterproofing in the construction industry, in particular in roofing materials, PVC is an important component of the waterproofing sheets. Plasticizers have long been used to control the workability of PVC. However, these plasticizers have the major disadvantage that they migrate. In other words, over time the plasticizers migrate either to the surface, where they result in surface stickiness, or they migrate into the carrier that connects them with a foundation or subsoil. Experience shows that the migration is increased by high temperatures, e.g. of the type that occur as a result of solar radiation.

Moreover, the migration causes the depletion of plasticizer in the PVC sheet, as a result of which its elasticity deteriorates sharply over time, so that the sheets become brittle, which sooner or later results in cracking. Therefore as a result of the migration of the plasticizer, the properties that are essential for a PVC sheet, namely impermeability to moisture, flexibility and resistance to aging, are lost.

DESCRIPTION OF THE INVENTION

The object of the invention is therefore to make available waterproofing membranes that do not have the above mentioned disadvantages.

Surprisingly, it has been found that this object is accomplished by a membrane according to claim 1.

The core of the invention is therefore a membrane 1 comprising a sealing layer 2, whereby the sealing layer consists of more than 50% by weight of PVC, in relation to the total weight of the sealing layer, and a barrier layer 3. The barrier layer 3 can be either a barrier layer S1 31 or a barrier layer S2 32.

In the case of a barrier layer S1 31, it is a barrier layer that has a polyvinyl alcohol layer 4 comprising more than 50% by weight of copolymer PA, in relation to the total weight of the polyvinyl alcohol layer 4, which is connected with the sealing layer 2 by a polyurethane layer 5, whereby the polyurethane layer 5 consists of more than 10% by weight polyurethane PUR, in relation to the total weight of the polyurethane layer 5.

In the case of a barrier layer S2 32, it is a barrier layer consisting of a composition comprising 5-50% by weight polyurethane PUR and 50-95% by weight copolymer PA.

The polyurethane PUR has at least one nucleophilic functional group which is selected from the group consisting of a hydroxyl group, carboxyl group, sulfonate group and phosphate group. The copolymer PA is an ethylene-vinyl alcohol copolymer.

The membranes according to the invention have significantly less plasticizer migration than the membranes of the prior art and are characterized by improved resistance to aging, in particular with regard to the adherence of the barrier layer 3 to the sealing layer 2 and impermeability to moisture.

Additional aspects of the invention include methods for the manufacture of the membranes described above and are the subject of additional independent claims. Particularly advantageous embodiments of the invention are the subject of the dependent claims.

BRIEF DESCRIPTION OF THE DRAWINGS

The invention is explained by means of the drawings in greater detail below, whereby it should be noted that only the elements that are essential for an immediate understanding of the invention are shown. Identical elements in the different drawings are identified by the same reference numerals. It should also be noted that these figures are schematic drawings without any indication of dimensions.

WAYS OF CARRYING OUT THE INVENTION

The present invention relates to a membrane 1 comprising a sealing layer 2, whereby the sealing layer consists of more than 50% by weight PVC, in relation to the total weight of the sealing layer, and a barrier layer 3.

The sealing layer 2 consists of more than 50% by weight PVC in relation to the total weight of the sealing layer. Preferably, the sealing layer consists of more than 70% by weight PVC in relation to the total weight of the sealing layer.

To ensure that the sealing layer is as effective as possible, it must be as waterproof as possible and must also not decompose or be mechanically damaged under the long-term effects of water or moisture. Films that are particularly suitable for use as a sealing layer are those that are already used in the prior art for waterproofing purposes in above-ground construction and civil engineering. The bulkhead should advantageously have at least a low degree of elasticity so that differences between the expansion of the waterproofing membrane and the foundation caused by temperatures, for example, or stresses caused by cracks in the foundation can be spanned without damage to or cracking of the sealing layer, which would have an adverse effect on the sealing function of the sealing layer.

The sealing layer 2 can also contain materials that are suitable as processing aids for PVC. Materials of this type are typically selected from the group consisting of high-density polyethylene (HDPE), medium-density polyethylene (MDPE), low-density polyethylene (LDPE), polyethylene (PE), polypropylene (PP), polyethylene terephthalate (PET), polystyrene (PS), ethylene vinyl acetate (EVA), chlorosulfonated polyethylene, thermoplastic polyolefin (TPO), ethylene-propylene diene monomer (EPDM) and polyisobutylene (PIB) and mixtures thereof. The sealing layer 2 advantageously consists of less than 5% by weight, preferably less than 1% by weight, particularly preferably less than 0.5% by weight of the above mentioned materials which are suitable for use as processing aids for PVC, in relation to the total weight of the sealing layer.

The sealing layer preferably contains a percentage of plasticizers of 20-45% by weight, particularly preferably 30-45% by weight, in relation to the total weight of the sealing layer.

The plasticizers used are typically esters of organic carboxylic acids or their anhydrides such as phthalates, such as dioctyl phthalate, diisononyl phthalate or diisodecyl phthalate, adipates such as dioctyl adipate, azelates and sebacates, for example, polyols such as polyoxyalkylene polyols or polyester polyols, for example, organic phosphoric and sulfonic acid esters of polybutene.

The sealing layer advantageously has a layer thickness in the range of millimeters, typically between 0.2 and 15 mm, preferably between 0.5 and 4 mm.

The barrier layer 3 can be either a barrier layer S1 31 or a barrier layer S2 32.

Figure 1:
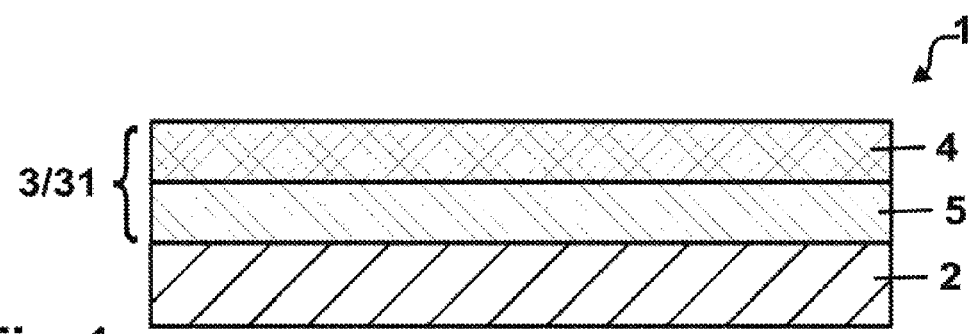
FIG. 1 shows a cross section through a membrane according to the invention.

FIG. 1 shows a cross section through one possible membrane according to the invention that has a barrier layer S1 31.

The barrier layer S1 31 has a polyvinyl alcohol layer 4 comprising more than 50% by weight of copolymer PA, in relation to the total weight of the polyvinyl alcohol layer 4, which is bonded with the sealing layer 2 by a polyurethane layer 5, whereby the polyurethane layer 5 consists of more than 10% by weight of polyurethane PUR, in relation to the total weight of the polyurethane layer 5.

The polyvinyl alcohol layer 4 comprising more than 50% by weight copolymer PA in relation to the total weight of the polyvinyl alcohol layer 4.

The copolymer PA is an ethylene vinyl alcohol copolymer.

Ethylene vinyl alcohol copolymers of this type are typically obtained by copolymerization of ethylene with a vinyl ester monomer. If appropriate, additional monomers, typically with an unsaturated C—C double bond, can be present during copolymerization and incorporated into the copolymer. After obtaining the resulting copolymer, a hydrolysis step is performed.

Preferably, the ethylene vinyl alcohol copolymer is produced by hydrolyzing a copolymer obtained by copolymerization of ethylene with a vinyl ester monomer and optionally an additional monomer with an unsaturated C—C double bond.

The degree of hydrolysis in mole % in the copolymer PA is preferably ≥90 mole %, in particular ≥95 mole % and most preferably ≥99 mole %.

Potential vinyl ester monomers are selected from the list consisting of vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate and vinyl versatate. Preference is given to the use of vinyl acetate.

Preferably, the fraction in mole % of ethylene in the copolymer PA is 20-50 mole %, in particular 25-40 mole % and most preferably 29-38 mole %. It will be clear to a person skilled in the art that the ethylene in question is in the state in which it is copolymerized in the copolymer PA.

Preferably, the fraction in mole % of vinyl alcohol in the copolymer PA is 80-50 mole %, in particular 75-60 mole %. It will be clear to a person skilled in the art that the vinyl alcohol in question is in the state in which it is copolymerized in the copolymer PA.

It can also be advantageous if the copolymer PA also has an additional monomer. Preferably, the fraction in mole % of the additional monomer in the copolymer PA is 0.1-30 mole %. It will be clear to a person skilled in the art that this is a monomer in the state in which it is copolymerized in the copolymer PA.

The density of the copolymer PA is preferably 1.25-1.1 g/cm$^3$, in particular 1.21-1.17 g/cm$^3$.

The melting point of the copolymer PA, measured with DSC, is preferably 150-200° C., in particular 170-190° C.

The glass transition temperature of the copolymer PA, measured with DSC, is preferably 50-70° C., in particular 55-65° C.

Preferred copolymers PA are those sold commercially, for example, under the name Soarnol® by the Nippon Synthetic Chemical Industry Co., Ltd.

The barrier layer S1 preferably consists of more than 80% by weight, in particular preferably by more than 95% by weight of copolymer PA, in relation to the total weight of the barrier layer S1.

The barrier layer S1 advantageously has a layer thickness in the micrometer range, typically between 100 and 1 μm, preferably between 10 and 2 μm.

The ethylene vinyl alcohol layer 4 of the barrier layer S1 31 is bonded to the sealing layer 2 by a polyurethane layer 5. The polyurethane layer 5 consists of more than 10% by weight of polyurethane PUR, in relation to the total weight of the polyurethane layer 5, in particular of more than 20% by weight, and particularly preferably more than 40% by weight.

In this document, substance names that begin with "poly" such as polyol or polyisocyanate describe substances that formally contain two or more of the functional groups that occur in their name per molecule.

The term "polymer" as used in the present document comprises, on the one hand, a group of macromolecules that are chemically uniform but that differ in terms of degree of polymerization, molar weight and chain length, and that are produced by a poly-reaction (polymerization, polyaddition, polycondensation). On the other hand, the term also comprises derivatives of such a group of macromolecules from poly-reactions, i.e. compounds that were obtained by reactions such as, for example, additions or substitutions of functional groups in specified macromolecules and which can be chemically uniform or chemically non-uniform. The term also includes so-called pre-polymers, i.e. reactive oligomeric pre-polymers, the functional groups of which participate in the construction of macromolecules.

The term "polyurethane polymer" comprises all polymers that are produced according to the diisocyanate polyaddition process. That also includes those polymers that are practically or entirely free of urethane groups. Examples for polyurethane polymers are polyether polyurethane, polyester polyurethane, polyether polyurea, polyureas, polyester polyureas, polyisocyanurates and polycarbodiimides.

The polyurethane PUR is preferably a polyester polyurethane or a poly(meth)acrylate PAC.

Polyurethanes PUR that have at least one nucleophilic group can in particular be produced from at least one polyisocyanate and at least one polyol as well as at least one monomer M1 that has at least one isocyanate group or one group that is reactive with respect to isocyanate groups, plus at least one nucleophilic functional group.

Polyisocyanates that can be used include commercially available aliphatic, cycloaliphatic or aromatic polyisocyanates, in particular diisocyanates.

Suitable polyols include in particular polyester or polyether polyols, preferably polyester- or polyether diols. Suitable polyols also include low-molecular weight divalent or multivalent alcohols such as, for example, 1,2-ethanediol, 1,3- and 1,4-butanediol, 1,2- and 1,3-propanediol, neopentyl glycol, diethylene glycol, triethylene glycol, the isomeric dipropylene glycols and tripropylene glycols, the isomeric pentanediols, hexanediols, heptanediols, octanediols, nonanedioles, decanedioles, undecanedioles, 1,3 and 1,4 cyclohexane dimethanol, hydrated bisphenol A, dimeric fatty alcohols, 1,1,1 trimethylolethane, 1,1,1-trimethylolpropane, glycerin, pentaerythrite, sugar alcohols such as xylite, sorbite or mannite, sugars such as saccharose, other polyhydric alcohols, low molecular weight alkoxylation products of the above mentioned divalent and multivalent alcohols and mixtures thereof.

Suitable monomers M1 preferably have at least one carboxyl group and/or one sulfonate group. The monomer M1 is preferably an amino carboxylic acid, a hydroxycarboxylic acid, in particular a dihydroxyalkyl carboxylic acid such as dimethylol propionic acid or a similarly structured diol carboxylic acid, or a sulfonic acid that has NCO-reactive groups such as, for example, a dihydroxy sulfonic acid. Preferably the monomer M1 that has a sulfonate group is the sodium salt of N-(2-aminoethyl)-2-aminoethane sulfonic acid.

It has been shown that suitable polyurethanes are in particular those that are described, for example, as "Polymer (PII)" in DE 100 00 656 A1 or WO 01/34559 A1, or as "polyurethane" in DE 195 21 500 A1.

Poly(meth)acrylates PAC that have at least one nucleophilic group can in particular be produced from at least one (meth)acrylate monomer and at least one monomer M2 that is polymerizable with the (meth)acrylate monomer and also has at least one nucleophilic functional group. For example, poly(meth)acrylates of this type are copolymers [consisting] of at least one (meth)acrylate monomer and at least one unsaturated carboxylic acid, in particular (meth)acrylic acid, maleic acid, fumaric acid, crotonic acid or a similar acid, a (meth)acrylamide or a (meth)acrylic acid ester that has a hydroxyl group, in particular hydroxyalkyl(meth)acrylate such as hydroxybutyl acrylate (HBA), hydroxybutyl methacrylate (HPMA), hydroxypropyl acrylate (HPA), hydroxypropyl methacrylate (HPMA), hydroxyethyl acrylate (HEA) or hydroxyethyl methacrylate (HEMA) or a partial ester of a polyol, preferably glycerin or trimethylol propane, with (meth)acrylic acid.

Preferably it is a polyurethane PUR with a molecular weight of 10,000-500,000 g/mol.

The polyurethane layer 5 advantageously has a layer thickness in the micrometer range, typically between 10 and 0.1 µm, preferably between 5 and 0.2 µm, particularly preferably between 4 and 0.5 µm.

Figure 2:
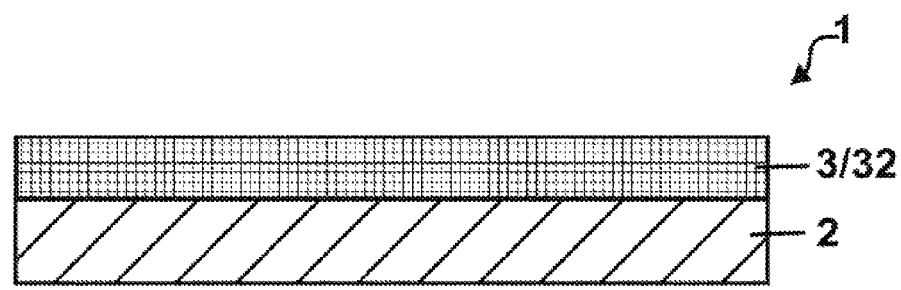
FIG. 2 shows a cross section through an additional possible membrane according to the invention.

FIG. 2 shows a cross section through one possible membrane according to the invention which has a barrier layer S2 32.

In the case of a barrier layer S2 32, it is a barrier layer consisting of a composition comprising 5-50% by weight, preferably 5-20% by weight, of polyurethane PUR and 50-95% by weight, preferably 80-95% by of weight copolymer PA.

The polyurethane PUR and the copolymer PA are polyurethane PUR and copolymer PA, as described above. Preference is also given to the use as polyurethane PUR and copolymer PA of the preferred polyurethane PUR and copolymer PA mentioned above.

The barrier layer S2 32 advantageously has a layer thickness in the micrometer range, typically between 100 and 1 µm, preferably between 1 and 2 µm.

The barrier layer S2 32 preferably consists of more than 90% by weight, particularly preferably of more than 98% by weight, of the sum of copolymer PA together with polyurethane PUR, in relation to the total weight of the barrier layer S2.

It is also advantageous if the membrane 1 is a flexible membrane, in particular a flexible sheet. This membrane can be easily rolled and thus easily stored or transported. In this manner, the membrane can be transported easily to the construction site, where it can be unrolled and cut to the required dimensions.

In an additional aspect, the invention also comprises a method for the production of a membrane 1 comprising a sealing layer 2, whereby the sealing layer consists of more than 50% by weight of PVC in relation to the total weight of the sealing layer. The membrane further comprises a barrier layer S1 31, whereby the barrier layer has a polyvinyl alcohol layer 4 comprising more than 50% by weight copolymer PA in relation to the total weight of the polyvinyl alcohol layer 4, which is bonded to the sealing layer 2 by a polyurethane layer 5. The polyurethane layer 5 consists of more than 10% by weight of polyurethane PUR, in relation to the total weight of the polyurethane layer 5. The method comprises the steps:
(i) Application of a polyurethane dispersion composition PD on a sealing layer 2;
(ii) Flashing-off of the polyurethane dispersion composition PD with the formation of a polyurethane layer 5;
(iii) Formation of a polyvinyl alcohol layer 4 on the polyurethane layer 5.

The steps are preferably carried out in the following sequence: Step (i) followed by step (ii) followed by step (iii).

The polyurethane PUR, the copolymer PA, the sealing layer 2, the barrier layer S1 31, the polyvinyl alcohol layer 4 and the polyurethane layer 5 have already been described above. Suitable and preferred for use as polyurethane PUR, copolymer PA, sealing layer 2, barrier layer S1 31, polyvinyl alcohol layer 4 and polyurethane layer 5 are the polyurethane PUR, copolymer PA, sealing layer 2, barrier layer S1 31, polyvinyl alcohol layer 4 and polyurethane layer 5 mentioned above as suitable and preferred.

The term "flashing-off" as used in the entire document means a drying of a polyurethane dispersion composition after the application of said composition, whereby the solvent or the dispersion agent is evaporated completely or at least predominantly.

The flashing-off can be accomplished by vaporizing in air with or without flashing-off means. The flashing-off means can be a fan, for example, in particular an air fan. Preferably, one flashing-off means is used. The flashing-off can be performed at room temperature or at an elevated temperature.

The flashing-off of the polyurethane dispersion composition (PD) is preferably performed in step (ii) for 1-5 minutes at 100-170° C.

The polyurethane dispersion composition PD is typically a dispersion of polyurethane PUR in a liquid phase, whereby the polyurethane PUR is present in the form of a solid. The liquid phase is preferably water.

Preferably, the polyurethane dispersion composition PD in step (ii) has a dispersed phase consisting of polyurethane PUR and a liquid phase, in particular water.

It is further advantageous if the polyurethane PUR of the dispersed phase is a non-reactive polyurethane.

Typically, the percentage of the dispersed phase is 0.1-90% by weight in relation to the total weight of the polyurethane dispersion composition PD. Preferably, the percentage of the dispersed phase is 30-60% by weight in relation to the total weight of the polyurethane dispersion composition PD.

The polyurethane dispersion composition PD is preferably an aqueous polyurethane dispersion, whereby the polyurethane PUR is present in the form of a solid and the percentage of the polyurethane PUR is preferably 15 to 55% by weight, in particular 25 to 50% by weight, preferably 35 to 45% by weight, in relation to the total weight of the polyurethane dispersion composition PD.

The formation of the barrier layer S1 31 in step (iii) is preferably carried out by the application of a composition Z2 in the liquid state consisting of copolymer PA and a solvent on the polyurethane layer 5.

The solvent is typically selected from the group consisting of water, ethanol, methanol, ethanol, 1-propanol, 1-butanol, 2-propanol, 2-butanol, 1,2-ethanediol, 1,2-propanediol, 1,3-propanediol, 1,2-butanediol, 1-3-butanediol, 1,4-butanediol, 2,3-butanediol, 1,5-pentanediol and prop-2-en-1-ol.

The solvent is preferably a 1-propanol/water mixture, and preferably the weight ratio of 1-propanol:water is from 99:1 to 1:99, in particular preferably from 5:1 to 3:1.

It is further advantageous if, after the application of the composition Z2 in the liquid state, the applied composition Z2 is heated for 1-5 minutes at 100-170° C. This step is advantageous because it promotes the formation of a uniform and gapless barrier layer S1.

It is further advantageous for the inhibition of plasticizer migration if the composition Z2 contains a percentage of 1-25% by weight copolymer PA, particularly preferably 15-20% by weight, in relation to the total weight of the composition Z2.

In the composition Z2, the weight ratio of copolymer PA to solvent is preferably from 1:100 to 1:4, in particular from 1:10 to 1:5.

In another aspect, the invention also comprises an additional method for the production of a membrane 1 comprising a sealing layer 2, whereby the sealing layer consists of more than 50% by weight of PVC, in relation to the total weight of the sealing layer.

The membrane further comprises a barrier layer S2 32, whereby the barrier layer S2 32 consists of a composition comprising 5-50% by weight, preferably 5-20% by weight, polyurethane PUR and 50-95% by weight, preferably 80-95% by weight, copolymer PA, comprising the steps:

(i') Application of a composition Z1 comprising polyurethane PUR, copolymer PA and the solvent on a sealing layer 2;

(ii') Flashing-off of the composition Z1 forming a barrier layer S2 32.

Preferably, the steps are carried out in the sequence: step (i'), followed by step (ii').

The polyurethane PUR, the copolymer PA, the sealing layer 2 and the barrier layer S2 32 have already been described above. Suitable and preferred polyurethane PUR, copolymer PA, sealing layer 2 and barrier layer S2 32 are those that are mentioned above as suitable and preferred polyurethane PUR, copolymer PA, sealing layer 2 and barrier layer S2 32.

It is further advantageous if the application of the composition Z1 in step (i') is carried out by the application of the composition Z1 in the liquid state. The viscosity of the composition Z1 at 25° C. measured according to DIN EN ISO 3219/A.3 is advantageously 500-30,000 mPas.

It is further advantageous if the flashing-off of the composition Z1 in step (ii') is carried out for 1-5 minutes at 100-170° C.

The solvent of the composition Z1 is typically selected from the group consisting of water, ethanol, methanol, ethanol, 1-propanol, 1-butanol, 2-propanol, 2-butanol, 1,2-ethanediol, 1,2-propanediol, 1,3-propanediol, 1,2-butanediol, 1-3-butanediol, 1,4-butanediol, 2,3-butanediol, 1,5-pentanediol and prop-2-en-1-ol.

The solvent is preferably a 1-propanol/water mixture, and preferably the weight ratio of 1-propanol:water is from 99:1 to 1:99, in particular preferably from 5:1 to 3:1.

It is further advantageous if the percentage of the sum of polyurethane PUR together with copolymer PA is 1-30% by weight, in particular 15-25% by weight, in relation to the total weight of the composition Z1.

The membrane 1 manufactured in this manner can be cut to length, trimmed, rolled up or reprocessed immediately as necessary. The rolls with the membrane can be stored or transported as necessary.

An additional aspect of the present invention relates to the use of the waterproofing membrane 1 described in detail above for the waterproofing of foundations and subsoils.

The membrane 1 is typically used in the form of a prefabricated sheet. In this case, the membrane is preferably fabricated by an industrial process in a film-producing plant and preferably arrives at the construction site in the form of a membrane that is then unrolled for use. However, the membrane can also be used in the form of strips, typically with a width of 1-20 cm, for example, to seal seams between two roofing sheets. The membrane can also be in the form of and used as flat bodies for the repair of damaged locations in sealing membranes, such as roofing sheets for example.

A preferred use of the membrane 1 is therefore a use for the waterproofing of above-ground and underground structures, in particular of roofs and floors.

In an additional aspect, the present invention relates to a molded body, the surface of which has a membrane 1, whereby the membrane is located on the molded body with its side facing away from the sealing layer 2. The molded body is typically a formed body of the above ground or underground structure. The term "molded body" means an object with a three-dimensional shape.

EXAMPLES

Production of Compositions Za and Zb

The component copolymer PA of the compositions Za and Zb was Soarnol D2908 or Soarnol D3808, commercially available from Nippon Gohsei, Japan. The solvent component was water and n-propanol. The two components were mixed with each other into the compositions Za and Zb in the parts by weight indicated in table 1.

TABLE 1

| compositions Za and Zb. | | |
|---|---|---|
| | Za | Zb |
| Soarnol D2908 | 20 | — |
| Soarnol D3808 | — | 20 |
| Water | 16 | 16 |
| n-propanol | 64 | 64 |
| Sum of the parts by weight | 100 | 100 |

Manufacture of the Polyurethane Dispersion Compositions (PD)

The compounds listed in table 2, in the parts by weight indicated in table 2, were mixed with one another to obtain the polyurethane dispersion compositions PD1 and PD2. Incorez® W2400 (both available from INCOREZ LTD, Great Britain) and Bayhydrol® UH 2606 (Bayer Material Science, Germany) were used as the polyurethane PUR. The film-forming additive is a tripropyleneglycol-n-butylether; the liquid phase is water; the wetting agent was a siloxane compound, and hydrophobic pyrogenic silicic acid was used as the thixotropic agent.

TABLE 2 polyurethane dispersion compositions PD1 and PD2.

|  | PD1 | PD2 |
| --- | --- | --- |
| PUR |  |  |
| Incorez W2400 | 71.4** | — |
| Bayhydrol XP 2606 | — | 94.3* |
| Film-forming additive | 10 | 0.5 |
| Water | 16.6 | 3.7 |
| Wetting agent | 2 | 1.5 |
| Thixotropic agent | — | — |
| Sum of parts by weight | 100 | 100 |

*the 94.3 parts by weight relate to a 35% dispersion of polyurethane PUR in water,
**the 71.4 parts by weight relate to a 40% dispersion of polyurethane PUR in water.

Production of the Sealing Layer

A composition consisting of:

PVC (55% by weight in relation to the total weight of the composition), plasticizer, diisononyl phthalate from Sigma-Aldrich, Switzerland (39% by weight in relation to the total weight of the composition), stabilizer, tin stabilizer dibutylin-diacetate from Sigma-Aldrich, Switzerland (1% by weight in relation to the total weight of the composition), $CaCO_3$ from Sigma-Aldrich, Switzerland (5% by weight in relation to the total weight of the composition) formed by flat nozzle extrusion into a film 1.5 mm thick.

Test for Plasticizer Migration

From the membranes, test specimens with the dimensions 120 mm×120 mm were produced and weighed (weight dO). Subsequently, these test specimens were placed on a body with the dimensions 120 mm×120 mm and a thickness of approximately 40-50 mm made of EPS (expanded polystyrene hard foam). A glass plate with the dimensions 100 mm×100 mm was also placed on the test specimens and a weight of 2 kg was placed thereon. This arrangement was stored for 28 days at 70° C., 50±5% relative humidity. Thereafter, the test specimens were weighed again (weight d28) and the difference in weight was determined in percent of the weight dO.

Production of Reference Membranes (Ref. 2, Ref. 3)

The respective compositions Za (for Ref. 2) and Zb (for Ref. 3) were applied for the formation of a polyvinyl alcohol layer by means of a film applicator unit (K-CONTROL-COATER System K 202, ERICHSEN, Germany) in a layer thickness of 24 μm at a temperature of 30° C. to a sealing layer with the dimensions 20 cm×30 cm×1.5 mm, the production of which was described above, and heated for 2 minutes in a furnace at a temperature of 160° C.

Production of the Membrane According to the Invention Comprising a Sealing Layer S1 (Exp. 1, Exp. 2)

The polyurethane dispersion PD1 was applied for Exp. 1 and Exp. 2 by means of a film applicator unit (K-CONTROL-COATER System K 202, ERICHSEN, Germany), in a layer thickness of 4 μm on a sealing layer with the dimensions 20 cm×30 cm×1.5 mm, the production of which was described above. The films were heated in a furnace for 2 minutes at a temperature of 160° C. Immediately thereafter, the corresponding composition Za (for Exp. 1) or Zb (for Exp. 2) was applied by means of the above mentioned film applicator unit, to form a polyvinyl alcohol layer in a layer thickness of 24 μm on the sealing layer at a temperature of 30° C. and heated in a furnace for 2 minutes at a temperature of 160° C.

Production of Membrane According to the Invention Comprising a Sealing Layer S2 (Exp. 3, Exp. 4)

80 parts by weight of the composition Za (for Exp. 3) or Zb (for Exp. 4) described above were mixed with 20 parts by weight of the polyurethane dispersions PD1 described above and applied by means of a film applicator unit (K-CONTROL-COATER System K 202, ERICHSEN, Germany) in a layer thickness of 24 μm (layer thickness immediately after the application) to a sealing layer of 20 cm×30 cm×11.5 mm, the production of which was described above. The films were heated for 2 minutes at a temperature of 160° C. in a furnace (the layer thickness after the heating was 4-6 μm).

Plasticizer Migration Test

An untreated sealing layer Ref. 1, a reference membrane with a polyvinyl alcohol layer having the composition Za (Ref. 2), a reference membrane with a polyvinyl alcohol layer having the composition Zb (Ref. 3), two membranes according to the invention with a sealing layer S1 (Exp. 1, Exp. 2) and two membranes according to the invention with a sealing layer S2 (Exp. 3, Exp. 4) were subjected to the plasticizer migration test described above.

The weight losses in % by weight are presented in table 3.

TABLE 3

Weight losses of the membranes in the plasticizer migration test in % by weight

| Membrane | Weight losses in % by weight |
| --- | --- |
| Ref. 1 | 5.60% |
| Ref. 2 | 0.47% |
| Ref. 3 | 0.38% |
| Exp. 1 | 0.42% |
| Exp. 2 | 0.33% |
| Exp. 3 | 0.52% |
| Exp. 4 | 0.37% |

The plasticizer migration tests were conducted with membranes that correspond to the membranes Exp. 1, Exp. 2, Exp. 3 and Exp. 4 according to the invention, but in which PD1 and PD2 were replaced. The same weight losses in % by weight of the membranes were found in the plasticizer migration test as were found in table 3 with the use of PD1.

Test for Aging

Test specimens with the dimensions 20 cm×10 cm were produced from the membranes according to the invention described above and from the membranes Ref. 2 and Ref. 3. The test specimens were aged for 28 days at a temperature of 70±2° C. in a convection oven. Subsequently, the test specimens were bent 20 times in the center, folded over, and the detachment of the barrier layer from the membrane was evaluated visually. The membranes according to the invention showed that in comparison to the membranes Ref. 2 and Ref. 3, there was no delamination of the respective barrier layers S1 and S2.

NOMENCLATURE

1 Membrane
2 Sealing layer

3 Barrier layer
31 Barrier layer S1
32 Barrier layer S2
4 Polyvinyl alcohol layer
5 Polyurethane layer

The invention claimed is:

1. A membrane comprising:
a sealing layer comprising more than 50% by weight of PVC in relation to the total weight of the sealing layer; and
a barrier layer S2 comprising 5-50% by weight of polyurethane PUR and 50-95% by weight copolymer PA,
wherein the polyurethane PUR has at least one nucleophilic functional group, which is selected from the group consisting of hydroxyl group, carboxyl group, sulfonate group and phosphate group, and the copolymer PA is an ethylene vinyl alcohol copolymer,
and wherein the sealing layer and the barrier layer are in direct contact.

2. The membrane as recited in claim 1, wherein the percentage in mole % of ethylene in the copolymer PA is 20-50 mole %.

3. The membrane as recited in claim 1, wherein the polyurethane PUR is produced from at least one polyisocyanate and at least one polyol as well as at least one monomer M1, whereby the monomer M1 has at least one nucleophilic functional group and the monomer M1 has at least one isocyanate group or a group that is reactive with respect to isocyanate groups.

4. The membrane as recited in claim 3, wherein the monomer M1 has a carboxyl group and/or a sulfonate group as the nucleophilic functional group.

5. The membrane as recited in claim 3, wherein the monomer M1 is an aminocarboxylic acid, a hydroxycarboxylic acid, in particular a dihydroxyalkylcarboxylic acid.

6. A method for the production of a membrane comprising a sealing layer, wherein the sealing layer comprises more than 50% by weight of PVC, in relation to the total weight of the sealing layer, and a barrier layer S2, wherein the barrier layer S2 comprises a composition comprising 5-50% by weight of polyurethane PUR and 50-95% by weight of copolymer PA, the method comprising:
applying a composition Z1 comprising polyurethane PUR, copolymer PA and solvent on a sealing layer; and
flashing-off of the composition Z1 to remove the solvent to form the barrier layer S2,
wherein the polyurethane PUR has at least one nucleophilic functional group, which is selected from the group consisting of hydroxyl group, carboxyl group, sulfonate group and phosphate group, and the copolymer PA is an ethylene vinyl alcohol copolymer,
and wherein the sealing layer and the barrier layer are in direct contact.

7. The method as recited in claim 6, wherein the applying comprises applying the composition Z1 in the liquid state.

8. The method as recited in claim 6, wherein the flashing-off is carried out for 1-5 minutes at 100-170° C.

9. The method as recited in claim 6, wherein the percentage of the sum of polyurethane PUR together with copolymer PA is 1-30% by weight in relation to the total weight of the composition Z1.

* * * * *